(12) United States Patent
Leisenring et al.

(10) Patent No.: US 7,856,868 B2
(45) Date of Patent: Dec. 28, 2010

(54) METHOD AND SYSTEM FOR DETERMINING THE FEASIBILITY OF AN AUTOMOTIVE EXHAUST CATALYST

(75) Inventors: William E. Leisenring, Tecumseh, MI (US); Vipul Patel, Canton, MI (US); Kevin Deweerdt, Wolverine Lake, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 802 days.

(21) Appl. No.: 11/750,010

(22) Filed: May 17, 2007

(65) Prior Publication Data

US 2008/0288110 A1    Nov. 20, 2008

(51) Int. Cl.
G01M 15/10    (2006.01)
(52) U.S. Cl. .................................... 73/114.75
(58) Field of Classification Search ............... 73/23.31, 73/114.69, 114.71, 114.75
See application file for complete search history.

(56) References Cited

U.S. PATENT DOCUMENTS

| | | |
|---|---|---|
| 4,116,053 A | 9/1978 | Blanke |
| 5,265,417 A | 11/1993 | Visser et al. |
| 5,553,450 A | 9/1996 | Schnaibel et al. |
| 6,550,237 B1 * | 4/2003 | Adamczyk et al. ............ 60/277 |
| 6,877,366 B2 | 4/2005 | Rabl |
| 6,922,985 B2 | 8/2005 | Wang et al. |
| 7,007,461 B2 | 3/2006 | Lewis et al. |
| 7,021,044 B2 | 4/2006 | Mukaihara et al. |
| 7,035,730 B2 | 4/2006 | White et al. |

* cited by examiner

Primary Examiner—Eric S McCall
(74) Attorney, Agent, or Firm—Ralph E. Smith

(57) ABSTRACT

This technology provides methods and systems for catalyst feasibility analysis and the optimal determination of automotive catalyst specifications utilizing, but not limited to, light-off performance, air-to-fuel ratio tolerance, and steady state emissions performance catalyst criteria. This technology additionally provides a catalyst feasibility index algorithm that includes various catalyst criteria inputs and provides for weighting factors to independently value each catalyst input. The technology further provides for the optimal determination of automotive catalyst specifications in order to reduce vehicle toxic exhaust emissions such as hydrocarbons (HC) and oxides of nitrogen ($NO_x$).

20 Claims, 3 Drawing Sheets

METHOD AND SYSTEM FOR DETERMINING THE FEASIBILITY OF AN AUTOMOTIVE EXHAUST CATALYST

FIELD OF THE INVENTION

The technology described herein relates generally to automotive exhaust catalyst specifications. More specifically, the technology relates to catalyst feasibility analysis and the determination of optimal automotive catalyst specifications utilizing, but not limited to, light-off performance, air-fuel ratio tolerance, and steady state emissions performance catalyst criteria.

BACKGROUND OF THE INVENTION

Control of the exhaust emissions from an automotive vehicle is an essential part of automotive design and vehicle development. An automotive vehicle, for example, utilizes a catalytic converter device installed in the vehicle exhaust line to reduce the toxicity of emissions from the internal combustion engine. Vehicle exhaust emissions of concern include hydrocarbons (HC), carbon monoxide (CO), and oxides of nitrogen ($NO_x$). It is desired to reduce these emissions to avoid health and environmental problems.

There are several types of catalytic converters known in the art. These include, for example, two-way catalytic converters and three-way catalytic converters. Each type of catalytic converter utilizes at least one catalyst. In two-way catalytic converters, which include, for example, pellet, monolith, and honeycomb types, a catalyst is used to rapidly increase exhaust temperature, oxidize carbon monoxide (CO) into carbon dioxide ($CO_2$), and oxidize unburnt hydrocarbons (HC) into water ($H_2O$) and carbon dioxide ($CO_2$). In three-way converters, for example, multiple catalysts are utilized such that there is an oxidizing catalyst and a reducing catalyst. A three-way catalytic convener reduces oxides of nitrogen ($NO_x$) to nitrogen ($N_2$) and oxygen ($O_2$), oxidizes carbon monoxide (CO) into carbon dioxide ($CO_2$), and oxidizes unburnt hydrocarbons (HC) into water ($H_2O$) and carbon dioxide ($CO_2$).

Known in the art are various catalysts that are used in catalytic converters. Often the catalyst is a precious metal. For example, widely used catalysts include platinum (Pt), palladium (Pd), and rhodium (Rh). Also known in the art are several metrics used for measuring individual catalyst criteria and behavior. For example, light-off performance, air-to-fuel ratio performance, and steady state emissions performance are metrics by which a catalyst is evaluated. What is needed in the art, however, is a method by which multiple metrics are utilized in a manner that provides a single value representative of the overall performance of the catalyst. Additionally, what is needed in the art is a method utilizing weighting factors by which adjustments are made to the metrics for specific vehicle applications. Furthermore, what is needed in the art is a method by which different catalyst technologies are evaluated in a manner that allows for the selection of a catalyst in the advanced phase of vehicle development.

BRIEF SUMMARY OF THE INVENTION

In various exemplary embodiments, the technology described herein provides methods and systems for catalyst feasibility analysis and the optimal determination of automotive catalyst specifications utilizing, but not limited to, light-off performance, air-fuel ratio tolerance, and steady state emissions performance catalyst criteria.

In one exemplary embodiment, the technology provides a method for determining the feasibility of a particular automotive exhaust catalyst and the associated optimal automotive catalyst specifications. The method includes utilizing a catalyst feasibility index algorithm to select an automotive exhaust catalyst, inputting into the catalyst feasibility index algorithm a plurality of values, each value indicative of an automotive exhaust catalyst criterion, obtaining a resultant catalyst feasibility index summary value, wherein the value is a single number, comparing the resultant catalyst feasibility index summary value with those of other tests conducted on other catalysts, and selecting a catalyst based upon the comparison of resultant catalyst feasibility index value with other catalysts. The plurality of values that is input into the feasibility index includes light-off performance, air-to-fuel ratio tolerance, and steady state emissions performance catalyst criteria. Another of the plurality of values that is input into the feasibility index includes the market cost of a precious metal utilized in a catalyst. The plurality of values that is input into the feasibility index includes a value representing the structure of the catalyst and a value representing the washcoat of the catalyst. The plurality of values that is input into the feasibility index includes a value representing a time measurement to catalyst breakthrough wherein the method further includes utilizing a square wave feed gas input for measuring to time to catalyst breakthrough.

The method further includes utilizing the following relationship:

$$CFI_{XX} = (AFR_{90} \times CPK_{ss\_avg\_xx})/LO_{70\_XX}.$$

CFI is the catalyst feasibility index, XX is a toxic automotive exhaust emission, $AFR_{90}$ is the stoichiometric air-to-fuel ratio tolerance window with a 90% efficiency for the toxic automotive exhaust emission. $CPK_{ss\_avg\_xx}$ is the statistical capability (Cpk) value for the toxic automotive exhaust emission. The Cpk utilizes the following relationship:

$$Cpk = (\text{Mean Efficiency} - 90\%)/(3\sigma_{efficiency}).$$

$LO_{70\_xx}$ is light-off performance at the temperature to reach 70% efficiency for the toxic automotive exhaust emission.

When XX represents hydrocarbons, the method includes utilizing the following relationship:

$$CFI_{HC} = (AFR_{90} \times CPK_{ss\_avg\_HC})/LO_{70\_HC}$$

When XX represents oxides of nitrogen ($NO_x$), the method further includes utilizing the following relationship:

$$CFI_{NOx} = (AFR_{90} \times CPK_{ss\_avg\_NOx})/LO_{70\_NOx}$$

In another exemplary embodiment, the method also provides that the catalyst feasibility index further includes a plurality of weighting factors. The method further includes utilizing the follow relationships:

$$CFI_{HC} = [(1+\alpha 1) \times (AFR_{90}) \times (1+\alpha 2) \times CPK_{ss\_avg\_HC})]/[(1-\alpha 3) \times (LO_{70\_HC})], \text{ and}$$

$$CFI_{NOx} = [(1+\alpha 1) \times (AFR_{90}) \times (1+\alpha 4) \times (CPK_{ss\_avg\_NOx})]/[(1-\alpha 5) \times LO_{70\_NOx})];$$

wherein $\alpha 1$ is a stoichiometric window weighting factor, $\alpha 2$ is a hydrocarbon (HC) steady state efficiency weighting factor, $\alpha 3$ is a hydrocarbon (HC) light-off performance weighting factor, $\alpha 4$ is an oxide of nitrogen ($NO_x$) steady state efficiency weighting factor, and $\alpha 5$ is an oxide of nitrogen ($NO_x$) light-off performance weighting factor.

The method further includes averaging the catalyst feasibility index for hydrocarbons, $CFI_{HC}$, with the catalyst feasibility index for oxides of nitrogen, $CFI_{NOx}$. The following relationship is utilized to obtain an average catalyst feasibility index value:

$$CFI_{AVG} = \text{AVERAGE}(CFI_{HC}, CFI_{NOx}).$$

In yet another exemplary embodiment, the technology includes a computer readable medium encoded with programming for determining the feasibility of a particular automotive exhaust catalyst and the associated optimal automotive catalyst specifications. The programming is configured to utilize a catalyst feasibility index algorithm to select an automotive exhaust catalyst, input into the catalyst feasibility index algorithm a plurality of values, each value indicative of an automotive exhaust catalyst criterion, obtain a resultant catalyst feasibility index summary value, wherein the value is a single number, compare the resultant catalyst feasibility index summary value with those of other tests conducted on other catalysts, and select a catalyst based upon the comparison of resultant catalyst feasibility index value with other catalysts. The plurality of values that is input into the feasibility index includes light-off performance, air-to-fuel ratio tolerance, steady state emissions performance catalyst criteria. The plurality of values that is input into the feasibility index includes the market cost of a precious metal utilized in a catalyst. The plurality of values that is input into the feasibility index includes a value representing the structure of the catalyst and a value representing the washcoat of the catalyst. The plurality of values that is input into the feasibility index includes a value representing a time measurement to catalyst breakthrough. The programming is further configured to utilize a square wave feed gas input for measuring to time to catalyst breakthrough.

The computer readable medium is encoded with programming for determining the feasibility of a particular automotive exhaust catalyst, and the associated optimal automotive catalyst specifications includes programming configured to utilize the following relationship:

$$CFI_{XX} = (AFR_{90} \times CPK_{ss\_avg\_xx})/LO_{70\_XX}$$

wherein CFI is the catalyst feasibility index, XX is a toxic automotive exhaust emission, $AFR_{90}$ is the stoichiometric air-to-fuel ratio tolerance window with a 90% efficiency for the toxic automotive exhaust emission, and $CPK_{ss\_avg\_xx}$ is the statistical capability (Cpk) value for the toxic automotive exhaust emission. The Cpk utilizes the following relationship:

$$Cpk = (\text{Mean Efficiency} - 90\%)/(3\ \sigma_{efficiency}); \text{ and}$$

wherein $LO_{70\_XX}$ is light-off performance at the temperature to reach 70% efficiency for the toxic automotive exhaust emission.

When XX represents hydrocarbons, the computer readable medium encoded with programming includes programming configured to utilize the following relationship:

$$CFI_{HC} = (AFR_{90} \times CPK_{ss\_avg\_HC})/LO_{70\_HC}$$

When XX represents oxides of nitrogen ($NO_x$), the computer readable medium encoded with programming includes programming configured to utilize the following relationship:

$$CFI_{NOx} = (AFR_{90} \times CPK_{ss\_avg\_NOx})/LO_{70\_NOx}$$

In yet another exemplary embodiment, the computer readable medium encoded with programming provides that the catalyst feasibility index further includes a plurality of weighting factors. The programming is further configured to utilize the follow relationships:

$$CFI_{HC} = [(1+\alpha 1) \times (AFR_{90}) \times (1+\alpha 2) \times CPK_{ss\_avg\_HC})]/[(1-\alpha 3) \times (LO_{70\_HC})], \text{ and}$$

$$CFI_{NOx} = [(1+\alpha 1) \times (AFR_{90}) \times (1+\alpha 4) \times (CPK_{ss\_avg\_NOx})]/[(1-\alpha 5) \times LO_{70\_NOx}]$$

wherein $\alpha 1$ is a stoichiometric window weighting factor, $\alpha 2$ is a hydrocarbon (HC) steady state efficiency weighting factor, $\alpha 3$ is a hydrocarbon (HC) light-off performance weighting factor, $\alpha 4$ is an oxide of nitrogen ($NO_x$) steady state efficiency weighting factor, and $\alpha 5$ is an oxide of nitrogen ($NO_x$) light-off performance weighting factor.

The computer readable medium encoded with programming further includes programming configured to average the catalyst feasibility index for hydrocarbons, $CFI_{HC}$, with the catalyst feasibility index for oxides of nitrogen, $CFI_{NOx}$. The programming is configured to utilize the following relationship to obtain an average catalyst feasibility index value:

$$CFI_{AVG} = \text{AVERAGE}(CFI_{HC}, CFI_{NOx}).$$

Advantageously, the method for optimal determination of automotive catalyst specifications provides measurement of overall catalyst performance, including for example, but not limited to, light-off performance, air-fuel ratio tolerance, and steady state emissions performance, thus overcoming the deficiencies of known methods in the art. Additionally, the technology provides a method for optimal determination of automotive catalyst specifications that is adaptable to any vehicle system by adjusting weighting factors according to system specifications. Furthermore, this technology provides the ability to select an optimal and capable catalyst in the advance stages of program development and provides the key knowledge base required to successfully react to changes in the precious metals market.

There has thus been outlined, rather broadly, the features of the technology in order that the detailed description that follows may be better understood, and in order that the present contribution to the art may be better appreciated. There are additional features of the technology that will be described and which will form the subject matter of the claims. Additional aspects and advantages of the technology will be apparent from the following detailed description of an exemplary embodiment which is illustrated in the accompanying drawings. The technology is capable of other embodiments and of being practiced and carried out in various ways. Also, it is to be understood that the phraseology and terminology employed are for the purpose of description and should not be regarded as limiting.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

Before describing the disclosed embodiments of the present invention in detail, it is to be understood that the invention is not limited in its application to the details of the particular arrangement shown here since the invention is capable of other embodiments. Also, the terminology used herein is for the purpose of description and not of limitation.

In various exemplary embodiments, the technology provides methods and systems for catalyst feasibility analysis and the optimal determination of automotive catalyst specifications utilizing, but not limited to, light-off performance, air-fuel ratio tolerance, and steady state emissions performance catalyst criteria.

In one exemplary embodiment, the technology provides a method for determining the feasibility of a particular automotive exhaust catalyst and the associated optimal automotive catalyst specifications. The method includes utilizing a catalyst feasibility index algorithm to select an automotive exhaust catalyst, inputting into the catalyst feasibility index algorithm a plurality of values, each value indicative of an automotive exhaust catalyst criterion, obtaining a resultant catalyst feasibility index summary value, wherein the value is a single number, comparing the resultant catalyst feasibility index summary value with those of other tests conducted on other catalysts, and selecting a catalyst based upon the comparison of resultant catalyst feasibility index value with other catalysts.

Figure 1:
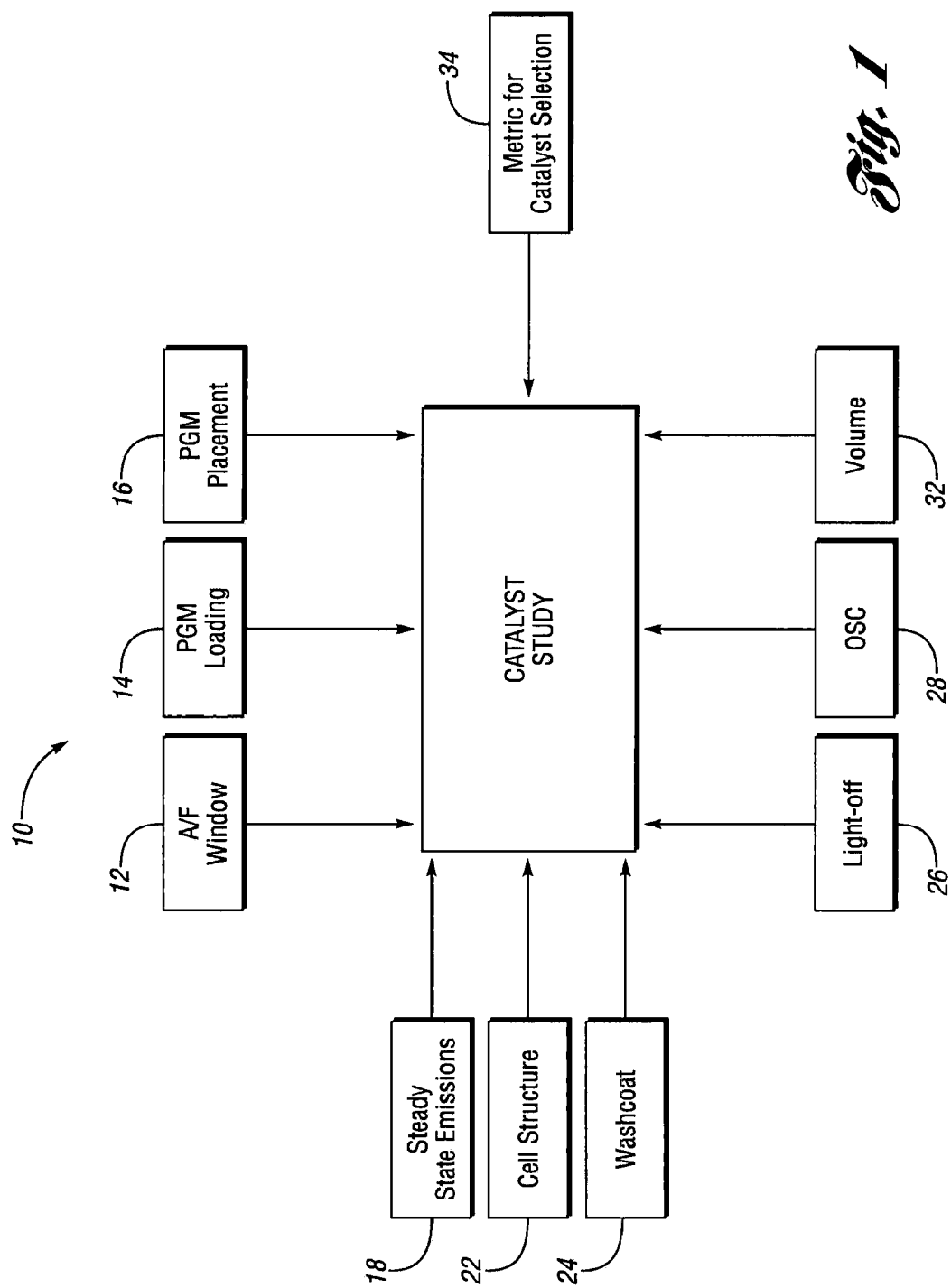
FIG. 1 is a schematic diagram illustrating potential factors included in a catalyst feasibility index to aid in the optimal determination of automotive catalyst specifications, including, for example, light-off performance, air-fuel ratio tolerance, and steady state emissions performance catalyst criteria, according to an embodiment of the invention.

Referring now to FIG. 1, a functional diagram 10 illustrates the potential factors that are included in a catalyst feasibility index to aid in the optimal determination of automotive catalyst specifications 34. The plurality of values that is input into the feasibility index includes light-off performance 26, air-to-fuel ratio tolerance 12, and steady state emissions performance 18 catalyst criteria. Another of the plurality of values that is input into the feasibility index includes the market cost of a precious metal utilized in a catalyst. The plurality of values that is input into the feasibility index includes a value representing the structure 22 of the catalyst and a value representing the washcoat 24 of the catalyst. The plurality of values that is input into the feasibility index includes a value representing a time measurement to catalyst breakthrough wherein the method farther includes utilizing a square wave feed gas input for measuring to time to catalyst breakthrough. The plurality of values also includes volume 32 and OSC 28. OSC 28 is Oxygen Storage Capacity and is an indication of how much oxygen the catalyst can store for oxidation/reduction performance. PGM is precious metals. PGM loading 14 is the mix of precious metals used in the catalyst formulation. PGM placement 16 is where the metal is placed relative to the front and rear of the catalyst with respect to exhaust flow.

To determine the optimal automotive catalyst specifications the following relationship is utilized:

$$CFI_{XX}=(AFR_{90} \times CPK_{ss\_xx})/LO_{70\_XX}$$

CFI is the catalyst feasibility index, XX is a toxic automotive exhaust emission, $AFR_{90}$ is the stoichiometric air-to-fuel ratio tolerance window with a 90% efficiency for the toxic automotive exhaust emission. $CPK_{ss\_avg\_xx}$ is the statistical capability (Cpk) value for the toxic automotive exhaust emission. The Cpk utilizes the following relationship:

$$Cpk=(\text{Mean Efficiency}-90\%)/(3\ \sigma_{efficiency}).$$

$LO_{70\_XX}$ is light-off performance at the temperature to reach 70% efficiency for the toxic automotive exhaust emission.

For steady state efficiency the catalyst efficiency is measured at a range of operating points. For example, Table 1 includes various operating points that are measured in determining catalyst efficiency.

TABLE 1

| Mass Flow Rate | A/F Oscillation | | Temp |
|---|---|---|---|
| (g/s) | Frequency (Hz) | Amplitude (%) | (° C.) |
| 15, 30, 45 | 0.5, 1.0, 2.0 | ±2, ±4, ±8 | 450, 600 |

The data points are used to calculate statistical capability (Cpk) per constituent.

When XX represents hydrocarbons, the method includes utilizing the following relationship:

$$CFI_{HC}=(AFR_{90} \times CPK_{ss\_avg\_HC})/LO_{70\_HC}$$

When XX represents oxides of nitrogen ($NO_x$), the method further includes utilizing the following relationship:

$$CFI_{NOx}=(AFR_{90} \times CPK_{ss\_avg\_NOx})/LO_{70\_NOx}$$

In another exemplary embodiment, the technology provides that the catalyst feasibility index further includes a plurality of weighting factors. The following relationships are utilized:

$$CFI_{HC}=[(1+\alpha 1) \times (AFR_{90}) \times (1+\alpha 2) \times CPK_{ss\_avg\_HC})]/[(1-\alpha 3) \times (LO_{70\_HC})], \text{ and}$$

$$CFI_{NOx}=[(1+\alpha 1) \times (AFR_{90}) \times (1+\alpha 4) \times (CPK_{ss\_avg\_NOx})]/[(1-\alpha 5) \times LO_{70\_NOx})];$$

wherein $\alpha 1$ is a stoichiometric window weighting factor, $\alpha 2$ is a hydrocarbon (HC) steady state efficiency weighting factor, $\alpha 3$ is a hydrocarbon (HC) light-off performance weighting factor, $\alpha 4$ is an oxide of nitrogen ($NO_x$) steady state efficiency weighting factor, and $\alpha 5$ is an oxide of nitrogen ($NO_x$) light-off performance weighting factor.

The technology further includes averaging the catalyst feasibility index for hydrocarbons, $CFI_{HC}$, with the catalyst feasibility index for oxides of nitrogen, $CFI_{NOx}$. The following relationship is utilized to obtain an average catalyst feasibility index value:

$$CFI_{AVG}=\text{AVERAGE}(CFI_{HC}, CFI_{NOx}).$$

The catalyst feasibility index has been used on test catalysts to determine optimal automotive catalyst specifications and ultimately to select a catalyst for a vehicle during an advanced design stage. Six catalysts and their associated data points are illustrated in Table 2.

TABLE 2

| Catalyst | Front | Rear | Washcoat | Structure | PGM Cost† |
|---|---|---|---|---|---|
| 1 | 0.66 (0/250/34) | 0.50 (102/0/25) | SI-3550/SI-3500 | 600/4.3, 400/4.5 | $66.14 |
| 2 | 0.66 (0/250/34) | 0.50 (81/0/20) | SI-3550/SI-3500 | 600/4.3, 400/4.5 | $60.31 |
| 3 | 0.66 (0/250/34) | 0.50 (61/0/20) | SI-3550/SI-3550 | 600/4.3, 400/4.5 | $57.04 |
| 4 | 0.66 (0/250/42) | 0.50 (102/0/25) | SI-3550/SI-3550 | 600/4.3, 400/4.5 | $71.23 |
| 5 | 0.50 (0/102/25) | 0.50 (81/0/20) | SI-3550/SI-3500 | 600/4.3, 400/4.5 | $39.79 |
| 6 | 0.50 (0/166/34) | 0.50 (0/166/34) | SI-3550/SI-3550 | 600/4.3, 400/4.5 | $48.68 |
| ULEVII | 0.66 (0/475/32) | 0.55 (0/102/26) | SI-3550/SI-3500 | 600/4.3, 400/4.5 | $70.55 |

The PGM Cost in Table 2 is based on January 2006 market prices. The ULEVII data points are based on Dec. 19, 2005 2008 PROC Test Groupings. These data points are, for example, input into the catalyst feasibility index.

Once the test data points of Table 2 have been utilized in the catalyst feasibility index, the resultant automotive catalyst specifications for determining the optimal catalysts are known. As illustrated in Table 3, these include light-off performance, air-fuel ratio tolerance, and steady state emissions performance catalyst criteria.

TABLE 3

| Catalyst | Light Off (Temp. @ 70% η) | Stoich. Window (F/A) 10000 | CpK | CFI 1000 | Normalized CFI to #4 | PGM COST |
|---|---|---|---|---|---|---|
| 1 | 357.5 | 3.766 | 1.748 | 18.413 | 0.843 | $66.14 |
| 2 | 361 | 4.003 | 1.402 | 15.549 | 0.711 | $60.31 |
| 3 | 358 | 3.766 | 1.417 | 14.911 | 0.682 | $57.04 |
| 4 | 349.5 | 4.244 | 1.8 | 21.854 | 1 | $71.23 |
| 5 | 409 | 2.351 | 0.248 | 1.424 | 0.065 | $39.79 |
| 6 | 369 | 2.821 | 0.68 | 5.195 | 0.238 | $48.68 |

Figure 2:
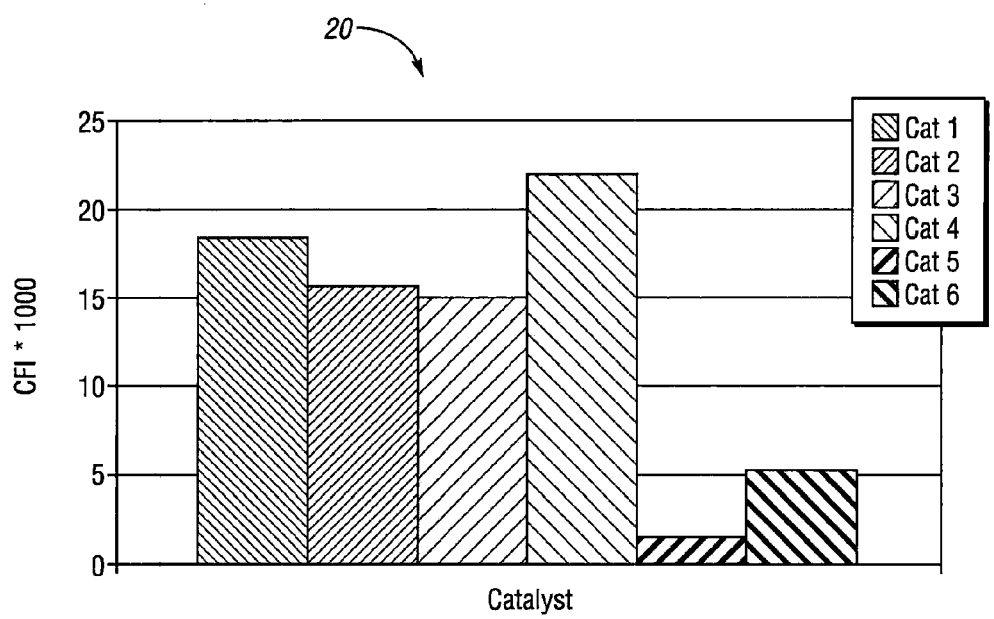
FIG. 2 is a schematic diagram illustrating results from six different sample test catalysts, indexed using the catalyst feasibility index, according to an embodiment of the invention.
Figure 3:
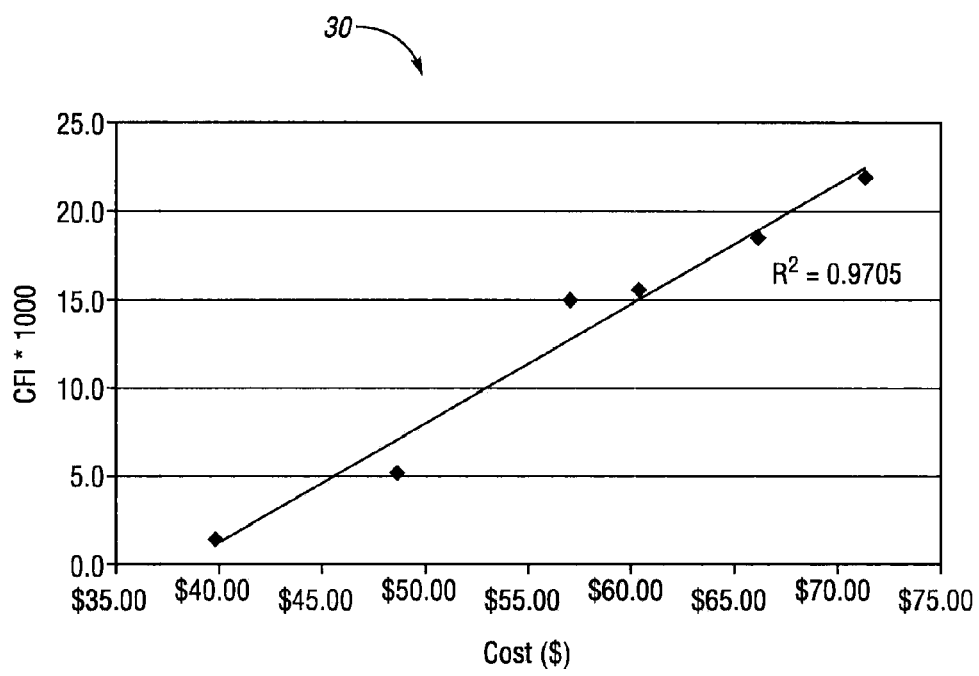
FIG. 3 is a schematic diagram illustrating the correlation between the catalyst feasibility index and the cost of materials for each test catalyst, thus indicating any performance benefit of a particular test catalyst and the associated change in cost, according to an embodiment of the invention.

Referring now to FIGS. 2 and 3, the catalyst feasibility index score is illustrated for each of the six test catalysts, 20 in FIG. 2, 30 in FIG. 3. In FIG. 3, the catalyst feasibility index score is illustrated as it correlates to cost. With this set of test data, the catalyst feasibility index correlates directly to the cost of the precious metals used in the catalyst. The best catalyst should have the highest CFI. However, in testing for production applications it may be more beneficial to find the best CFI relative to cost (CFI/$) that still meets functional requirements.

Figure 4:
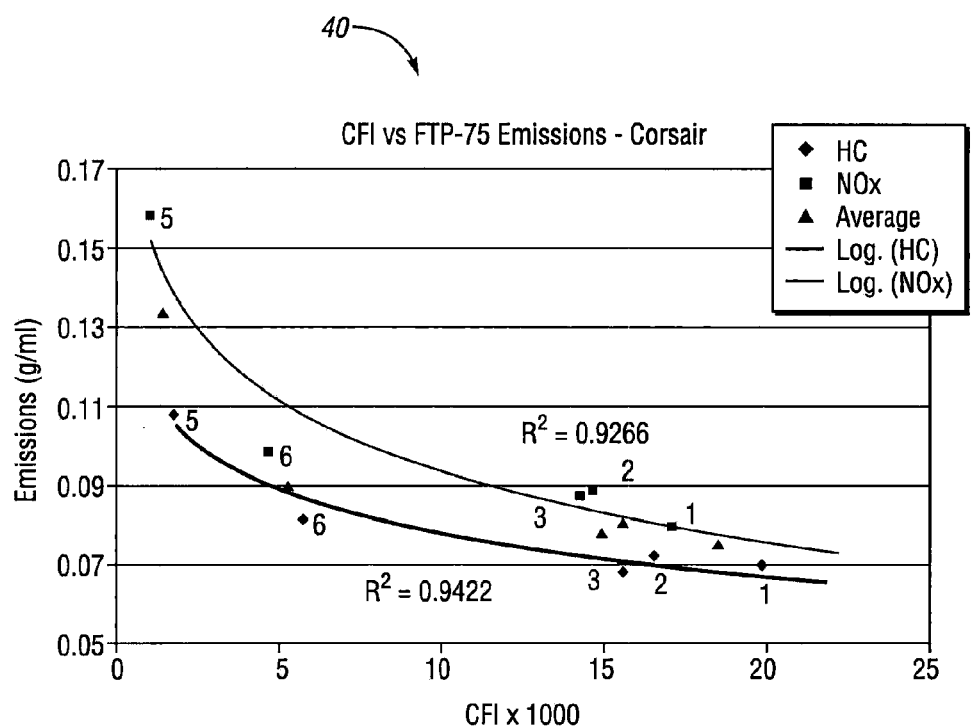
FIG. 4 is a schematic diagram illustrating the correlation between the catalyst feasibility index and the hydrocarbon (HC) and oxides of nitrogen ($NO_x$) emissions as measured in a federal test procedure (FTP) emissions test, and illustrated in logarithmic scale.

Referring now to FIG. 4, a diagram 40 illustrates the correlation between the catalyst feasibility index and the hydrocarbon (HC) and oxides of nitrogen ($NO_x$) emissions as measured in a federal test procedure (FTP) emissions test. The results are illustrated in logarithmic scale.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for determining the feasibility of a particular automotive exhaust catalyst and the associated optimal automotive catalyst specifications, the method comprising:

utilizing a catalyst feasibility index algorithm to select an automotive exhaust catalyst;

inputting into the catalyst feasibility index algorithm a plurality of values, each value indicative of an automotive exhaust catalyst criterion;

obtaining a resultant catalyst feasibility index summary value, wherein the value is a single number;

comparing the resultant catalyst feasibility index summary value with those of other tests conducted on other catalysts; and selecting a catalyst based upon the comparison of resultant catalyst feasibility index value with other catalysts.

2. The method for determining the feasibility of a particular automotive exhaust catalyst and the associated optimal automotive catalyst specifications of claim 1, wherein the plurality of values that are input into the feasibility index comprise: light-off performance, air-to-fuel ratio tolerance, and steady state emissions performance catalyst criteria.

3. The method for determining the feasibility of a particular automotive exhaust catalyst and the associated optimal automotive catalyst specifications of claim 1, wherein the plurality of values that are input into the feasibility index comprise:

the market cost of a precious metal utilized in a catalyst.

4. The method for determining the feasibility of a particular automotive exhaust catalyst and the associated optimal automotive catalyst specifications of claim 1, wherein the plurality of values that are input into the feasibility index comprise:

a value representing the structure of the catalyst; and a value representing the washcoat of the catalyst.

5. The method for determining the feasibility of a particular automotive exhaust catalyst and the associated optimal automotive catalyst specifications of claim 1, wherein the plurality of values that are input into the feasibility index comprise:

a value representing a time measurement to catalyst breakthrough; and wherein the method further comprises:

utilizing a square wave feed gas input for measuring to time to catalyst breakthrough.

6. The method for determining the feasibility of a particular automotive exhaust catalyst and the associated optimal automotive catalyst specifications of claim 1, the method further comprising:

utilizing the following relationship:

$$CFI_{XX}=(AFR_{90} \times CPK_{ss\_avg\_xx})/LO_{70\_XX}$$

wherein CFI is the catalyst feasibility index, XX is a toxic automotive exhaust emission, $AFR_{90}$ is the stoichiometric air-to-fuel ratio tolerance window with a 90% efficiency for the toxic automotive exhaust emission, $CPK_{ss\_avg\_xx}$ is the statistical capability (Cpk) value for the toxic automotive exhaust emission;

wherein the Cpk utilizes the following relationship:

$$Cpk=(\text{Mean Efficiency}-90\%)/(3\ \sigma_{efficiency}); \text{ and}$$

wherein $LO_{70\_XX}$ is light-off performance at the temperature to reach 70% efficiency for the toxic automotive exhaust emission.

7. The method for determining the feasibility of a particular automotive exhaust catalyst and the associated optimal automotive catalyst specifications of claim 6, wherein XX represents hydrocarbons, the method further comprising:
utilizing the following relationship:

$$CFI_{HC}=(AFR_{90} \times CPK_{ss\_avg\_HC})/LO_{70\_HC}.$$

8. The method for determining the feasibility of a particular automotive exhaust catalyst and the associated optimal automotive catalyst specifications of claim 6, wherein XX represents oxides of nitrogen ($NO_x$), the method further comprising:
utilizing the following relationship:

$$CFI_{NOx}=(AFR_{90} \times CPK_{ss\_avg\_NOx})/LO_{70\_NOx}.$$

9. The method for determining the feasibility of a particular automotive exhaust catalyst and the associated optimal automotive catalyst specifications of claim 6, wherein the catalyst feasibility index further comprises a plurality of weighting factors and wherein the method further comprises:
utilizing the follow relationships:

$$CFI_{HC}=[(1+\alpha 1) \times (AFR_{90}) \times (1+\alpha 2) \times CPK_{ss\_avg\_HC})]/[(1-\alpha 3) \times (LO_{70\_HC})], \text{ and}$$

$$CFI_{NOx}=[(1+\alpha 1) \times (AFR_{90}) \times (1+\alpha 4) \times (CPK_{ss\_avg\_NOx})]/[(1-\alpha 5) \times LO_{70\_NOx}];$$

wherein $\alpha 1$ is a stoichiometric window weighting factor;
wherein $\alpha 2$ is a hydrocarbon (HC) steady state efficiency weighting factor;
wherein $\alpha 3$ is a hydrocarbon (HC) light-off performance weighting factor;
wherein $\alpha 4$ is an oxide of nitrogen ($NO_x$) steady state efficiency weighting factor; and
wherein $\alpha 5$ is an oxide of nitrogen ($NO_x$) light-off performance weighting factor.

10. The method for determining the feasibility of a particular automotive exhaust catalyst and the associated optimal automotive catalyst specifications of claim 9, farther comprising:
averaging the catalyst feasibility index for hydrocarbons, $CFI_{HC}$, with the catalyst feasibility index for oxides of nitrogen, $CFI_{NOx}$; and
utilizing the following relationship to obtain an average catalyst feasibility index value:

$$CFI_{AVG}=\text{AVERAGE}(CFI_{HC}, CFI_{NOx}).$$

11. A computer readable medium encoded with programming for determining the feasibility of a particular automotive exhaust catalyst and the associated optimal automotive catalyst specifications, the programming configured to:
utilize a catalyst feasibility index algorithm to select an automotive exhaust catalyst;
input into the catalyst feasibility index algorithm a plurality of values, each value indicative of an automotive exhaust catalyst criterion;
obtain a resultant catalyst feasibility index summary value, wherein the value is a single number;
compare the resultant catalyst feasibility index summary value with those of other tests conducted on other catalysts; and
select a catalyst based upon the comparison of resultant catalyst feasibility index value with other catalysts.

12. The computer readable medium encoded with programming for determining the feasibility of a particular automotive exhaust catalyst and the associated optimal automotive catalyst specifications of claim 11, wherein the plurality of values that are input into the feasibility index comprise: light-off performance, air-to-fuel ratio tolerance, and steady state emissions performance catalyst criteria.

13. The computer readable medium encoded with programming for determining the feasibility of a particular automotive exhaust catalyst and the associated optimal automotive catalyst specifications of claim 11, wherein the plurality of values that are input into the feasibility index comprise:
the market cost of a precious metal utilized in a catalyst.

14. The computer readable medium encoded with programming for determining the feasibility of a particular automotive exhaust catalyst and the associated optimal automotive catalyst specifications of claim 11, wherein the plurality of values that are input into the feasibility index comprise:
a value representing the structure of the catalyst; and
a value representing the washcoat of the catalyst.

15. The computer readable medium encoded with programming for determining the feasibility of a particular automotive exhaust catalyst and the associated optimal automotive catalyst specifications of claim 11, wherein the plurality of values that are input into the feasibility index comprise:
a value representing a time, measurement to catalyst breakthrough; and
wherein the programming is further configured to:
utilize a square wave feed gas input for measuring to time to catalyst breakthrough.

16. The computer readable medium encoded with programming for determining the feasibility of a particular automotive exhaust catalyst and the associated optimal automotive catalyst specifications of claim 11, the programming is further configured to:
utilize the following relationship:

$$CFI_{XX}=(AFR_{90} \times CPK_{ss\_avg\_xx})/LO_{70\_XX}$$

wherein CFI is the catalyst feasibility index, XX is a toxic automotive exhaust emission, $AFR_{90}$ is the stoichiometric air-to-fuel ratio tolerance window with a 90% efficiency for the toxic automotive exhaust emission, $CPK_{ss\_avg\_xx}$ is the statistical capability (Cpk) value for the toxic automotive exhaust emission;

wherein the Cpk utilizes the following relationship:

$$Cpk=(\text{Mean Efficiency}-90\%)/(3\ \sigma_{efficiency}); \text{ and}$$

wherein $LO_{70\_XX}$ is light-off performance at the temperature to reach 70% efficiency for the toxic automotive exhaust emission.

17. The computer readable medium encoded with programming for determining the feasibility of a particular automotive exhaust catalyst and the associated optimal automotive catalyst specifications of claim 16, wherein XX represents hydrocarbons, and the programming is further configured to:

utilize the following relationship:

$$CFI_{HC}=(AFR_{90} \times CPK_{ss\_avg\_HC})/LO_{70\_HC}.$$

18. The computer readable medium encoded with programming for determining the feasibility of a particular automotive exhaust catalyst and the associated optimal automotive catalyst specifications of claim 16, wherein XX represents oxides of nitrogen ($NO_x$), and the programming is further configured to:

utilize the following relationship:

$$CFI_{NOx}=(AFR_{90} \times CPK_{ss\_avg\_NOx})/LO_{70\_NOx}.$$

19. The computer readable medium encoded with programming for determining the feasibility of a particular automotive exhaust catalyst and the associated optimal automotive catalyst specifications of claim 16, wherein the catalyst feasibility index further comprises a plurality of weighting factors and wherein the programming is further configured to:

utilize the follow relationships:

$$CFI_{HC}=[(1+\alpha 1) \times (AFR_{90}) \times (1+\alpha 2) \times CPK_{ss\_avg\_HC})]/[(1-\alpha 3) \times (LO_{70\_HC})], \text{ and}$$

$$CFI_{NOx}=[(1+\alpha 1) \times (AFR_{90}) \times (1+\alpha 4) \times (CPK_{ss\_avg\_NOx})]/[(1-\alpha 5) \times LO_{70\_NOx})];$$

wherein $\alpha 1$ is a stoichiometric window weighting factor;

wherein $\alpha 2$ is a hydrocarbon (HC) steady state efficiency weighting factor;

wherein $\alpha 3$ is a hydrocarbon (HC) light-off performance weighting factor;

wherein $\alpha 4$ is an oxide of nitrogen ($NO_x$) steady state efficiency weighting factor; and wherein $\alpha 5$ is an oxide of nitrogen ($NO_x$) light-off performance weighting factor.

20. The computer readable medium encoded with programming for determining the feasibility of a particular automotive exhaust catalyst and the associated optimal automotive catalyst specifications of claim 19, the programming is further configured to:

average the catalyst feasibility index for hydrocarbons, $CFI_{HC}$, with the catalyst feasibility index for oxides of nitrogen, $CFI_{NOx}$; and utilize the following relationship to obtain an average catalyst feasibility index value:

$$CFI_{AVG}=\text{AVERAGE}(CFI_{HC}, CFI_{NOx}).$$

* * * * *